Dec. 21, 1943.    C. B. SITTERSON, JR., ET AL    2,337,352
METAL DETECTOR
Filed Aug. 24, 1942    2 Sheets-Sheet 1
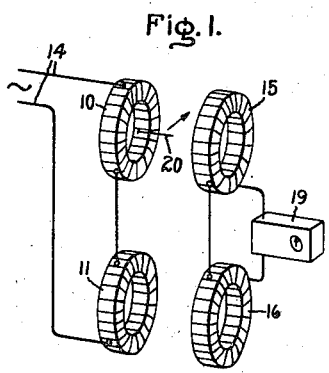
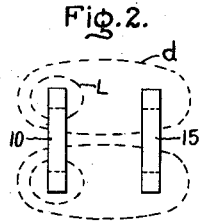
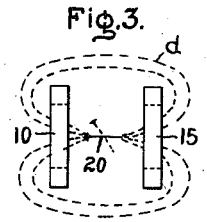
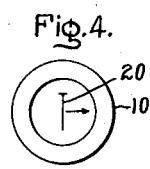
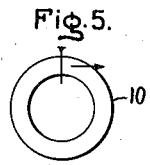
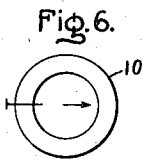
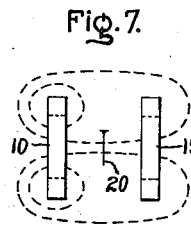
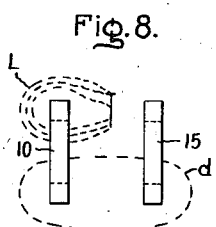
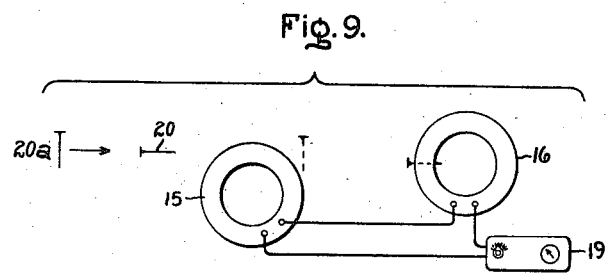
Inventors:
Cephas B. Sitterson Jr.,
Theodore M. Berry,
by Harry C. Dunham
Their Attorney.

Dec. 21, 1943.   C. B. SITTERSON, JR., ET AL   2,337,352
METAL DETECTOR
Filed Aug. 24, 1942   2 Sheets-Sheet 2
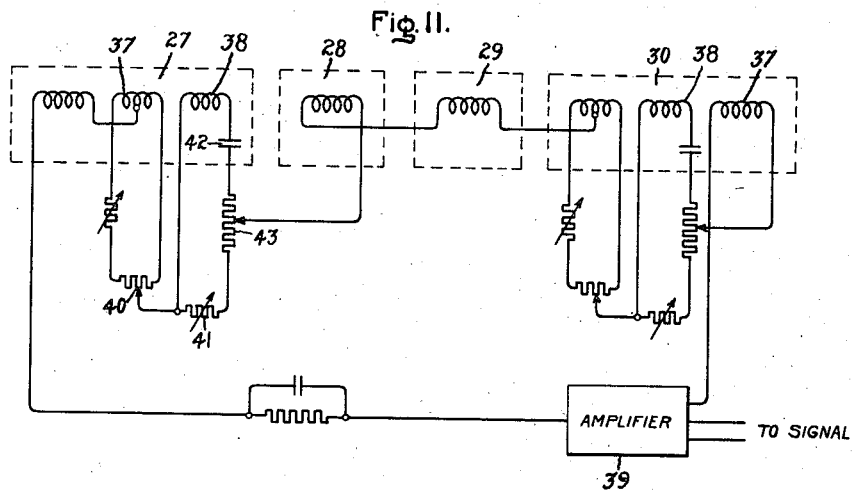
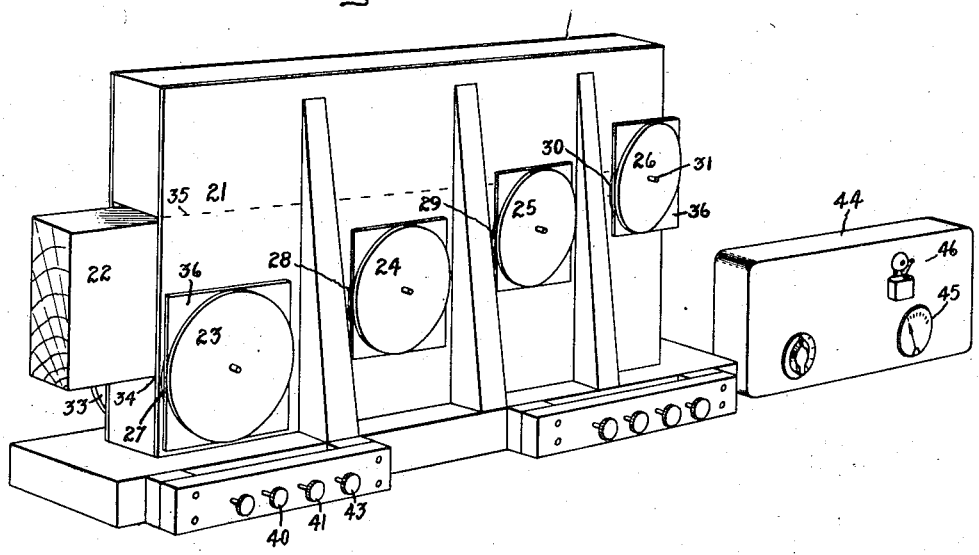
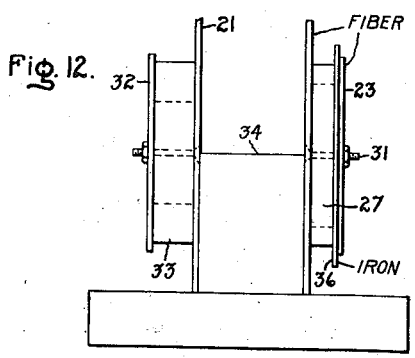
Inventors:
Cephas B. Sitterson Jr.,
Theodore M. Berry,
by Harry E. Dunham
Their Attorney.

Patented Dec. 21, 1943

2,337,352

UNITED STATES PATENT OFFICE 2,337,352

METAL DETECTOR

Cephas B. Sitterson, Jr., and Theodore M. Berry, Schenectady, N. Y., assignors to General Electric Company, a corporation of New York Application August 24, 1942, Serial No. 455,844

2 Claims. (Cl. 175—183)

Our invention relates to apparatus for detecting the presence of magnetic and non-magnetic metal parts otherwise hidden in non-magnetic non-conductive material. For example, the invention may be used to detect nails and screws in lumber. An important object of our invention is to detect nails or other metal objects in lumber and the like, regardless of how the hidden nail may be oriented and passed past the detecting apparatus.

Our invention finds application in the woodworking industry to detect nails and the like in lumber so as to avoid dulling or damaging the wood-working tools by the presence of nails and the like in the lumber used. In illustrating our invention we provide inspection apparatus consisting of exciting and detecting coils between which lumber in the shape of boards, planks and the like may be passed for the purpose of detecting nails and the like hidden in the lumber and giving a warning indication thereof and the approximate location of the hidden nail.

Apparatus of this general character is not new but difficulty was experienced with apparatus heretofore available for this purpose because of its inability to detect all nails, regardless of their location and orientation in the lumber and our invention relates to improved apparatus in this respect.

The features of our invention which are believed to be novel and patentable will be pointed out in the claims appended hereto. For a better understanding of our invention reference is made in the following description to the accompanying drawings in which Fig. 1 shows simplified detecting coil apparatus to be referred to in explaining the principles of our invention, Fig. 2 illustrates the normal flux distribution of the upper set of coils of Fig. 1 when no nail is present, Fig. 3 illustrates the flux distribution due to the presence of a magnetic nail oriented as shown, Figs. 4, 5 and 6 illustrate various relative orientations of a magnetic nail with respect to the detecting coil axis, Fig. 7 illustrates the flux distribution of a coil set such as the upper coils of Fig. 1 for the nail orientation represented in Fig. 4, Fig. 8 represents such flux distribution for orientation represented in Figs. 5 and 6, Fig. 9 illustrates in principle the staggering of the detecting coils and their alternate use as detecting and balancing coils, Fig. 10 is a perspective view of a preferred embodiment of our invention for inspecting planks, Fig. 11 shows a wiring diagram of the detecting coils of Fig. 10 and Fig. 12 is a view of the lower coil section of Fig. 10 as seen from the left end of Fig. 10.

Referring now to Fig. 1, 10 and 11 represent exciting coils which are excited in series from an alternating current source 14. Spaced from coil 10 is a detecting coil 15. Coils 14 and 15 are coaxial, are hollow as represented and are separated sufficiently that the lumber to be inspected may be passed between them in a direction at right angles to their flux axes. A similar coil 16 is similarly positioned with respect to coil 11. Coils 15 and 16 are connected in series opposition so that the voltages induced therein by their exciting coils 10 and 11 oppose each other and when the flux distribution is not influenced by the presence of magnetic or conductor material the secondary voltages are adjusted so as to be equal. As thus described coils 11 and 16 act as a balancing coil set for the detecting set of coils. Under such conditions the flux distribution of either set of exciting and balancing coils may be generally represented as in Fig. 2 where some of the flux $d$ of the exciting coil 10 threads the detecting coil 15 and some flux L does not. For convenience we will refer to the flux $d$ which threads the detecting coil as detecting flux and the flux L which does not thread the detecting coil as leakage flux. The two sets of coils may be similar and alternately used as detecting and balancing coil sets.

In the circuit of secondary detecting coil 15 and its balancing coil 16 is a suitable voltage responsive device 19 which produces a response when the opposing secondary voltages do not balance. If, now, a nail 20 be passed between one set of exciting and detecting coils, we have found that the flux distribution of such set may be changed and the nature of the change will depend upon the relative position of the nail with respect to the axis of the coils and the orientation of its longitudinal axis with respect to the flux axis of the coils. For example, let us assume that a piece of lumber containing an iron nail 20 be passed between coils 10 and 15 in the direction represented by the arrow adjacent the nail and that the nail passes centrally between the coils with its longitudinal axis parallel to the flux axis as represented in Fig. 1. This will increase the detecting flux relative to the leakage flux and we may represent this changed flux distribution as in Fig. 3. Under these conditions it is evident that coils 11 and 16 will retain the relative flux distribution represented in Fig. 2 but that coils 10 and 15 will momentarily have the flux distribution represented in Fig. 3. Hence the secondary voltages will become unbalanced and a large response of the device 19 will result, thus detecting the presence of the nail.

If, however, the nail be oriented so that its longitudinal axis be perpendicular to the flux axis and is vertical or nearly so and is passed in a horizontal direction centrally between the coils as represented in Figs. 4 and 7, we have found that there is no material change in the flux distribution due to the presence of the nail or at least no change that produces a definite response of instrument 19. Apparently the flux distribution remains essentially the same as in Fig. 2, as shown in Fig. 7. If, however, the nail be vertical and with its longitudinal axis perpendicular to the flux axis but passed horizontally between the coils near their upper or lower edges, as represented in Figs. 5 and 8, we have found that the normal flux distribution is disturbed and that the nail materially increases the leakage flux and decreases the indicating flux, as represented in Fig. 8. This also produces a responsive indication at 19. The same sort of flux disturbance is produced if the nail be passed horizontally between the centers of the coils with its axis horizontal and perpendicular to the flux axis, as represented in Fig. 6. Fig. 8 may represent the flux distribution resulting from the position of Fig. 6 if we consider the nail as now moving downward in Fig. 8. As thus considered, as the nail reaches the center of the coils the flux distribution will change to that represented in Fig. 7 and as the nail passes downward between the lower edges of the coils, the flux distribution will change again to that represented in Fig. 8, except that the leakage and detecting fluxes will change places vertically. Hence, there will be a double response of the indicating apparatus 19, once as the nail enters and once when it leaves the coils. We have thus illustrated some of the most sensitive and least sensitive detecting conditions and there are a variety of others of an intermediate sensitivity. For example, if for the condition represented in Figs. 1 and 3 the nail be oriented through an angle of 45 degrees on an axis perpendicular to the drawing as represented in dotted lines in Fig. 3, the condition will become less sensitive but the nail will still have considerable flux directing force tending to increase the detecting flux and, by providing a sensitive indicator, its presence will be detected.

Now, in order to detect nails and the like in a board or plank for those conditions such as represented in Figs. 4 and 7, for example, we provide a plurality of groups of exciting and detecting coils which are so staggered in overlapping relation with respect to the path of travel of the lumber which is passed therethrough that if a nail is not detected by one pair of coils it will be by a second or subsequent pair.

In Fig. 1 the pair of coils 11 and 16 were merely described as balancing coils for the pair 10—15. However, when a number of sets of coils are arranged in staggered relation along the path of travel of the lumber, we connect them in groups as in Fig. 1 so that all serve alternately both as detecting and balancing pairs of coils, as illustrated in Fig. 9 and in a practicable example in Figs. 10 and 11.

In Fig. 9 we have shown the detecting coils 15 and 16 of Fig. 1 spaced apart in the line of travel of the lumber to be inspected, which is assumed to be in a horizontal direction to the right. Also, coil 16 is elevated with respect to coil 15. If, now, a nail 20 be passed along a horizontal line to the right as indicated by the arrow, it will pass the peripheral edge of coil 15. While the exciting coils 10 and 11 are not shown, it is assumed that they are axially behind coils 15 and 16 and that the nail-carrying lumber passes between the exciting and detecting coils. When the nail 20 arrives opposite coil 15, it will produce little if any disturbance of the field, but when it arrives opposite coil 16 in the position indicated in dotted lines, it will produce a disturbance of the field analogous to that shown in Fig. 8 and a response of indicator 19 will result. If another nail 20a, oriented as shown, follows nail 20 in the path indicated, it will produce an indication when passing coil 15 but not when passing coil 16. The staggered multiple coil arrangement of our invention is thus illustrated. Furthermore, it will be noted that while both coils are used as detecting coils, they are also both used as balancing coils for each other.

It should be noted also that while the condition represented in Fig. 3 produces an increase in flux in the detecting coil 15 and the condition represented in Fig. 8 produces a decrease in flux in the detecting coil 15, both conditions produce an indication because both produce flux conditions in the detecting coil which are different from that in the balancing coil 16.

In the above we have described the action with respect to the detection of magnetic materials such as steel or iron nails. However, non-magnetic metal parts such as brass nails or screws may also be detected by the same apparatus by using high frequency excitation so as to produce excessive eddy currents in the metal parts if present. A high frequency flux seeks to avoid a path in which there exists non-magnetic conductor material. For example, if the nail 20, Fig. 7, were of brass instead of being magnetic and a high frequency flux of the order of 50,000 cycles were used, the nail would tend to form an eddy current shield between the two coils, decreasing the passage of flux to the detecting coil 15 and the detecting flux would decrease from a normal condition, thereby detecting the presence of the metal. The action of the detecting apparatus with respect to non-magnetic metals is in general the reverse of the action with respect to magnetic metals when high frequency excitation is used and both magnetic and non-magnetic metal parts will be detected simultaneously.

Fig. 10 represents apparatus which is employed to detect metal parts in lumber used for making gun stocks. In this illustration 21 represents a suitable longitudinal guide frame made from fiber and wood parts through which the lumber 22 is passed to test the same for metal inserts. 23, 24, 25 and 26 are the outer end supports of the test coils 27, 28, 29 and 30. The test coils are secured on one outer wall of the guide 21 as represented in Fig. 12 by being clamped between such wall and the support 23 by a non-magnetic bolt 31. The corresponding exciting coils are axially displaced and supported on the opposite outer wall of the guide, as shown at 32 in Fig. 12. It is noted that the lowermost set of exciting and detecting coils 33 and 27 have their centers in line with the bottom edge 34 of the opening in the guide while the upper set of coils including coil 30 have their centers on line with the upper edge 35 of the guide opening, while the other sets of coils including detecting coils 27 and 28 have intermediate positions the coils overlapping about half their diameter in the line of travel of the lumber so as to detect nails and the like in the lumber 22 regardless of the position and orientation of the nails in the lumber as the same is slid through the guide during a testing operation. We have found that the sensitivity can be improved by providing thin magnetic plates 36 extending across the outer ends of the detecting coils, as indicated.

Provision is made for exactly balancing the detecting coils both as regards amplitude and phase angle and connecting them in series opposition, as will be explained in connection with Fig. 11. In Fig. 11 the four detecting coils 27, 28, 29 and 30 are represented as enclosed by dotted line rectangles. Coils 27 and 30 include amplitude adjusting sections 37 and phase adjusting sections 38. Coils 27 and 29 are connected in series opposition to coils 28 and 30 with an amplifier 39. The exciting coils will be connected in series to a suitable source of A. C. supply.

It is evident that the voltage induced in coil 27 for a given excitation flux can be varied by varying the relative resistance at 40 in the two parts of the amplitude adjusting coil section 37 thereof, the two parts of the coil section 27 being connected in opposition. Hence, the coils 27 and 28 may be balanced as regards voltages. Also, the phase angle of coil 27 may be adjusted by adjusting the relative impedance of a resistor 41 as compared to a parallel circuit through condenser 42 and coil section 38. Thus the phase angle of coil 27 may be adjusted and made equal to that of coil 28. The series connection between coils 27 and 28 is through an adjustment along a resistance 43. In like manner coils 29 and 30 may be balanced with similar adjustments associated with coil 30 so that for lumber which is free from metal parts the detecting coil circuit will be balanced as to amplitude and phase angle. If desired coils 27 and 28 might be contained in one detector circuit and coils 29 and 30 in another as in Fig. 1 but this is unnecessary. Now, when a nail, screw or the like is contained within the lumber 22 which is passed through the testing apparatus, the detecting circuit will become unbalanced one or more times, either due to an increased or decreased induced voltage in one or more of the coils. The resulting unbalanced voltage in the detecting circuit is amplified by the amplifier 39 which may be contained within the box 44 of Fig. 10 and a suitable indication or alarm given on the instrument 45 or alarm 46. After becoming familiar with the operation of the apparatus the approximate location of the metal particle generally can be ascertained and that part of the lumber containing the metal discarded. The adjustable resistance features may conveniently be mounted on the base of the test apparatus as indicated in Fig. 10.

What we claim as new and desire to secure by Letters Patent in the United States is:

1. In apparatus for detecting the presence of metal parts in material such as lumber, a pair of sets of exciting and detecting coils, the set of a pair being axially aligned and displaced so as to act as an air core transformer with considerable leakage and to allow the material to be tested to be passed between them, means for energizing the exciting coils with alternating current so as to induce voltages in the detecting coils, means for connecting the detecting coils in series opposition under conditions such that the induced voltages balance when the inducting flux is uninfluenced by the presence of metal parts, means for detecting unbalance in the induced voltages, provisions for passing the material to be tested between the exciting and detecting coils of both sets such that a given point in the material which passes centrally between one set of coils passes off-center with respect to the other set of coils, whereby both sets of coils are available for use alternately as detecting and balancing sets.

2. Apparatus for detecting the presence of metal parts in material such as lumber, comprising a longitudinal guideway through which the material to be tested is adapted to be passed, an even number of pairs of exciting and detecting coils supported on said guide, the exciting coil and detecting coil of a pair being axially aligned and supported on opposite sides of the guideway with their axes at right angles to the path of travel of the material through the guideway such that the material may be passed between them, the different pairs of coils being displaced along the line of travel of the material and the coils of one pair overlapping the coils of another pair about halfway with respect to the line of travel of the material, such that a given point of the material which passes between the centers of one pair of coils will pass between the peripheral edges of another pair of coils, means for energizing the exciting coils with alternating current so as to induce voltages in the detecting coils, means for connecting the detecting coils in series opposition in a detecting circuit including adjustable means for balancing the opposed voltages when the induced voltages are uninfluenced by the presence of metal parts in the material being tested and voltage responsive means for detecting voltage unbalance in the detecting circuit.

CEPHAS B. SITTERSON, Jr.
THEODORE M. BERRY.